(12) United States Patent
Partridge et al.

(10) Patent No.: US 8,066,872 B1
(45) Date of Patent: Nov. 29, 2011

(54) DUAL WEIR VORTEX SKIMMER

(75) Inventors: D. Richard Partridge, Jackson, MS (US); Charles C. Partridge, Houston, TX (US); Jeffrey M. Partridge, Spring, TX (US)

(73) Assignee: International Spill Control LLC, Jackson, MS (US)

( * ) Notice: Subject to any disclaimer, the term of this patent is extended or adjusted under 35 U.S.C. 154(b) by 0 days.

(21) Appl. No.: 13/066,921

(22) Filed: Apr. 28, 2011

(51) Int. Cl.
*E02B 15/04* (2006.01)
(52) U.S. Cl. ............... 210/122; 210/170.05; 210/242.3; 210/512.1; 210/923
(58) Field of Classification Search ............... 210/122, 210/170.05, 170.09, 170.11, 242.1, 242.3, 210/512.1, 776, 923
See application file for complete search history.

(56) References Cited

U.S. PATENT DOCUMENTS

| | | | | |
|---|---|---|---|---|
| 3,635,342 | A * | 1/1972 | Mourlon et al. | 210/242.3 |
| 3,753,496 | A * | 8/1973 | Boyd | 210/242.3 |
| 3,853,767 | A * | 12/1974 | Mohn | 210/242.3 |
| 4,038,182 | A * | 7/1977 | Jenkins | 210/242.3 |
| 4,111,809 | A * | 9/1978 | Pichon | 210/242.1 |
| 4,139,470 | A * | 2/1979 | Stagemeyer et al. | 210/170.05 |
| 4,142,972 | A * | 3/1979 | Nebeker et al. | 210/242.3 |
| 4,301,008 | A * | 11/1981 | Baffert et al. | 210/242.3 |
| 4,610,788 | A * | 9/1986 | Ward | 210/242.3 |
| 5,118,412 | A * | 6/1992 | Schmidt | 210/122 |
| 5,200,066 | A * | 4/1993 | Jorgensen | 210/512.1 |
| 6,712,958 | B2 * | 3/2004 | Djelouah | 210/122 |
| 6,905,611 | B2 * | 6/2005 | Gustafsson | 210/776 |

* cited by examiner

*Primary Examiner* — Christopher Upton
(74) *Attorney, Agent, or Firm* — James L. Jackson (57) ABSTRACT

A skimmer system for removing a substantially liquid substance such as oil floating on the surface of a body of water has a reservoir body defining an collected fluid reservoir and having a primary weir edge. A weir tube extends upwardly within the reservoir and provides a secondary weir edge being of less height than the primary weir edge and defines a vortex chamber. A plurality of buoyancy members support the reservoir body in relation to the surface of the body of water and are adjustable relative to the reservoir body by power operated or mechanical devices for selective positioning of said primary weir edge relative to the water surface. A pump having a suction inlet is in communication with the vortex chamber and has a discharge outlet conducting recovered oil to a collection barge. A power source such as a hydraulic fluid supply is connected in driving relation with the pump.

20 Claims, 5 Drawing Sheets

DUAL WEIR VORTEX SKIMMER

BACKGROUND OF THE INVENTION

1. Field of the Invention

The present invention relates generally to skimmer systems for removing quantities of oil that is present on or near the surface of a body of water. More particularly, the present invention concerns an oil skimmer device having a primary weir that is selectively positioned relative to the surface of a body of water by means of a plurality of float members that are each adjustably mounted to the skimmer device. Even more specifically the present invention concerns the use of a secondary weir located within and below the level of the primary weir to ensure efficiency of oil recovery and to minimize the volume of water that enters the skimmer during skimming activity

2. Description of the Prior Art

Apparatus for skimming spilled oil from the surface of water have been used for a good number of years. In most cases, oil skimmers take the form of large or small boats that are fitted with a weir device, with the position of the weir being controlled by a crane and hoist mechanism. Typically buoyant booms are positioned downwind or down current on the water and serve to collect and retain oil so that it can be recovered by skimmer boats. In some cases the skimmer boats are provided with an endless oil attracting belt that separates oil from the surface of a body of water and employs rolls to squeeze the collected oil from the endless belt and deposit it in one or more skimmer chambers of the vessel.

It is known that spilled crude oil will often collect other contaminants and form a jelled oil/water/contaminant mixture that is difficult to recover by skimming and is difficult to pump when its recovery is accomplished. This jelled substance often extends well below the surface of the water, so that conventional skimmer devices have difficulty recovering it and handling it when the substance is recovered.

While oil skimmer devices are often satisfactory for recovery of spilled oil from rivers, streams and other bodies of water, when spilled oil moves to quite shallow water such as marshes, near beaches, shallow bays and the like most oil skimmer mechanisms cannot access such shallow water. Accordingly, when major oil spills occur and large quantities of oil are released, especially for long periods of time, it is practically impossible to prevent the spilled oil from causing significant environmental damage to marshes and other sensitive regions near shore. There is a long felt need for apparatus and systems that can accomplish effective recovery of spilled oil in both deep and shallow water conditions. It is desirable therefore to provide an oil skimmer mechanism that can be used in deep water conditions and can also be used in shallow water conditions and can be effectively used with or without booms for oil collection.

SUMMARY OF THE INVENTION

It is a principal feature of the present invention to provide a novel oil skimmer mechanism that can be rapidly transported to an oil spill site and can be easily and quickly deployed and put to use for skimming spilled oil from the surface of the water;

It is another feature of the present invention to provide a novel oil skimmer mechanism that can be easily and quickly adjusted on site to enable efficient recovery of spilled oil;

It is another feature of the present invention to provide a novel oil skimmer mechanism that has a fluid energized pump motor and macerating pump for generating a vortex action along with suction to enable efficient recovery and pumping of a jelled oil/water/contaminant mixture if present at an oil recovery site;

It is an even further feature of the present invention to provide a novel oil skimmer mechanism that employs a dual weir arrangement that enables efficient collection and recovery of spilled oil and minimizes the percentage of water that is collected along with the recovered oil; and It is also a feature of the present invention to provide a novel oil skimmer mechanism that incorporates a plurality of buoyancy devices having positions that can be easily and simply adjusted relative to a dual weir arrangement so that a skimming operation can be adjusted according to the water, oil, wind and other environmental conditions that are present at any point in time.

Briefly, the various objects and features of the present invention are realized through the provision of an oil skimmer mechanism that is of relatively small size and can be easily transported and handled by a small work boat or oil collection barge. A workboat and oil collection barge will be stationed within an area defined by a floating oil boom that can be handled by service boats. A plurality of oil skimmer mechanisms are deployed near the oil collection barge and have connection with the oil collection barge by means of oil discharge lines that are connected with a collected oil receiving manifold of the oil collection and storage barge. Hydraulic or pneumatic fluid supply lines extend from a power unit on the workboat or barge and deliver a pressurized fluid medium to fluid energized rotary pump motors of each of the oil skimmer mechanisms.

Each oil skimmer mechanism has wall structure defining an oil/water collection reservoir and defining an outer or primary weir over which oil and some water flow into the oil/water collection reservoir. Within the oil/water collection reservoir is located an inner or secondary weir that is lower than the primary weir and is disposed at the upper end of a secondary weir tube that forms a passage for pump suction and for development of a vortex for breaking up any jelled oil/water/debris mixture that enters the oil/water collection reservoir, thus preparing it for ease of pumping to the oil/water collection and storage barge. The oil skimmer mechanisms are each provided with adjustable buoyancy devices, enabling the primary weir to be easily adjusted to facilitate efficiency and enhanced volume of oil collection while minimizing the volume of water that is collected along with the oil.

BRIEF DESCRIPTION OF THE DRAWINGS

So that the manner in which the above recited features, advantages and objects of the present invention are attained and can be understood in detail, a more particular description of the invention, briefly summarized above, may be had by reference to the preferred embodiment thereof which is illustrated in the appended drawings, which drawings are incorporated as a part hereof.

It is to be noted however, that the appended drawings illustrate only a typical embodiment of this invention and are therefore not to be considered limiting of its scope, for the invention may admit to other equally effective embodiments.

In the Drawings.

DETAILED DESCRIPTION OF PREFERRED EMBODIMENT

Figure 1:
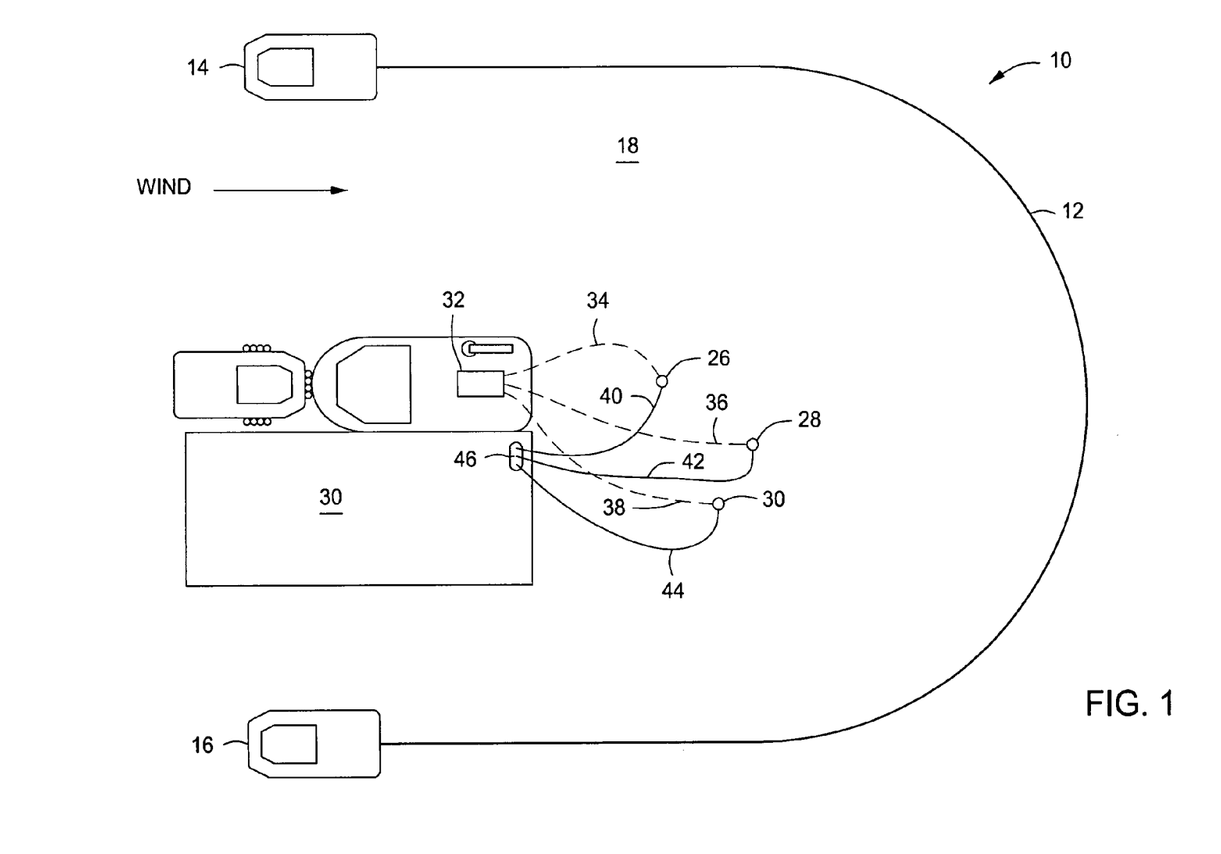
FIG. 1 is a schematic illustration in plan view showing an oil capturing boom positioned to collect oil on the surface of a body of water, oil handling and storage vessels and showing an arrangement utilizing three skimmer devices that are constructed and used according to the principles of the present invention to remove oil from the surface of the water and to transfer it to the oil handling and storage vessels.

Referring now to the drawings and first to FIG. 1, an oil capturing and skimming system is shown generally at 10 and includes a conventional oil collection boom 12 that is managed by a pair of boom service boats 14 and 16. Typically the boom 12 will be managed so that it is of generally U-shape with a boom opening 18 between the boom service boats 14 and 16 facing toward the direction from which the wind is blowing. In the absence of wind or as desired the boom service boats can be moved through the water, causing the boom to be pulled along the surface of the water, thereby collecting and concentrating all or most of the oil that is floating on or near the surface of the water.

An oil storage barge 20 is suitably located within the water surface area that is defined by the oil collection boom 12 and a workboat 22 is secured to or located near the storage barge. The workboat 22 may be independently powered and maneuvered or it and/or the oil storage barge may be maneuvered by a tugboat 24 as desired. The oil storage barge and/or the workboat 22 can be provided with an oil processing system for separating the collected oil from any water that is also collected and returning the separated and treated water to the body of water and ensuring that the oil storage barge contains mostly separated oil and very little, if any, of the collected water.

Figure 2:
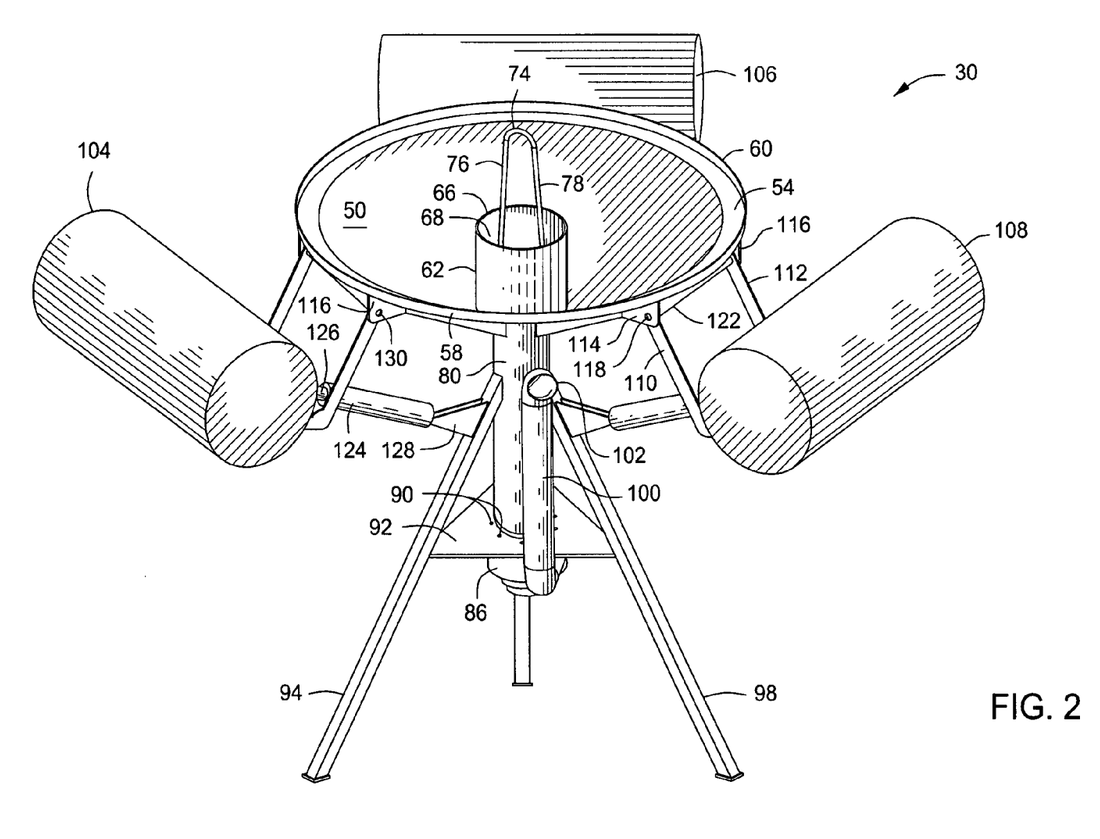
FIG. 2 is an isometric illustration showing one of the oil skimmer devices of FIG. 1.
Figure 3:
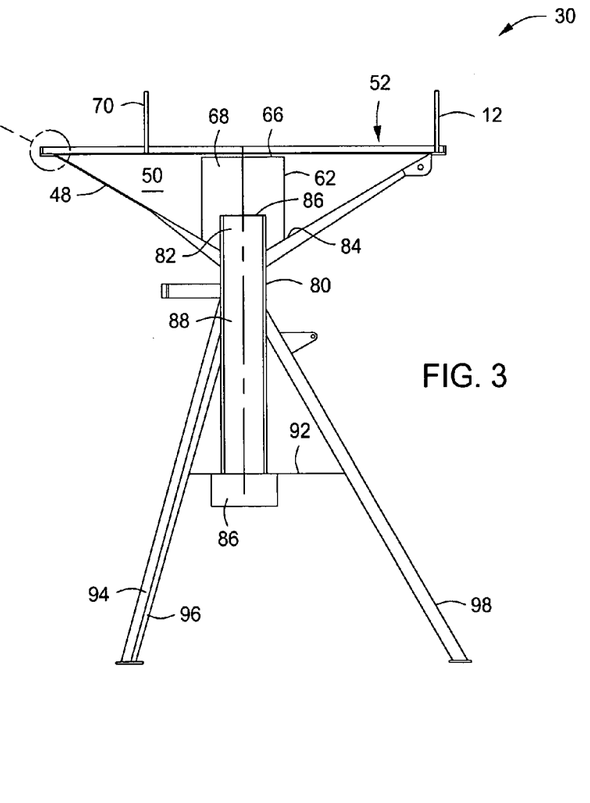
FIG. 3 is a sectional view illustrating portions of the skimmer device of FIG. 2 and showing the location and relationship of the primary and secondary weirs.
Figure 4:
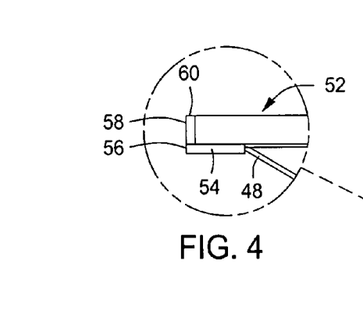
FIG. 4 is a fragmentary sectional view of the first weir edge of the primary weir and being enlarged to illustrate the configuration of the primary weir.

The oil capturing and skimming system of FIG. 1 is shown to be provided with three oil skimming devices 26, 28 and 30 each being constructed and operated according to the principles of the present invention and being shown in detail generally at 30 in FIGS. 2, 3 and 4. The workboat 22 is provided with a pressurized fluid power unit or source 32 having a plurality of pressurized fluid supply lines 34, 36 and 38 connecting the pressurized fluid supply lines to respective ones of the oil skimmer devices 26, 28 and 30.

The pressurized fluid supply source 32 is preferably a hydraulic fluid supply source and will be described as such; however it may conveniently take the form of a pneumatic fluid supply source if desired. Alternatively, the pressurize fluid medium for pump operation may be pressurized water if desired. The hydraulic power unit 32 preferably incorporates a 150 hp internal combustion engine that is connected in driving relation with a hydraulic fluid supply pump that is capable of providing a range of hydraulic pressure and volume for simultaneous operation of a plurality, typically three, of the oil skimmer units of the present invention. However, the hydraulic power unit may have an electrically energized motor if desired for operation of the hydraulic fluid supply pump for circulating sufficient fluid pressure to the hydraulic motors of the various oil skimmer devices.

A plurality of collected oil discharge lines 40, 42 and 44 are connected with the pump discharges of the respective oil skimmer devices 26, 28 and 30 and are in communication with a collected oil receiving manifold 46 for delivery of collected oil and water to one or more compartments within the oil storage barge 20. The hydraulic lines and the oil discharge lines are provided with floatation so that the weight or resistance of the lines do not significantly alter the positions of the oil skimmer devices with respect to the surface of the water.

Referring now particularly to FIGS. 2-4 each oil skimmer device 30 has a wall structure 48 defining an oil/water collection reservoir 50. The wall structure 50 is shown in the form of a generally conical wall; however it is to be borne in mind that the wall structure 48 may have any of a variety of geometric forms, such as cylindrical, rectangular, oval, etc., without departing from the spirit and scope of the present invention.

A desired function of the skimmer device 30 is to recover oil from the surface of the water, while at the same time minimizing the percentage of water that enters the oil/water collection reservoir 50. Another desired function of the skimmer device is to cause movement of oil on or near the surface of the water to and into the skimmer device, enhancing the efficiency of oil recovery. These features of the present invention are enabled by a dual weir arrangement as discussed in detail below.

To the upper edge of the wall structure 48 is mounted a primary weir shown generally at 52 having a substantially planar wall flange 54 that projects laterally outwardly from the outer periphery of the wall structure 48, as best shown in FIG. 4. At the outer periphery 56 of the substantially planar wall flange 54 is fixed a substantially vertically oriented weir wall 58 defining a primary weir edge 60. The primary weir edge 60 is preferably of generally circular configuration, but if desired it may be oval, rectangular, triangular or any other desired configuration. The primary weir edge is substantially continuous and defines a primary weir plane that is intended to be disposed in substantially parallel or substantially coplanar relation with the surface of the body of water on which the weir system is intended to operate. The primary weir edge may define substantially equally spaced notches along the periphery thereof, such as is shown at 142 in FIG. 6, if desired.

A secondary weir tube 62 is mounted to the wall structure 48 within the oil/water collection reservoir 50. The lower edge 64 of the secondary weir tube may be welded or otherwise connected to the wall structure 48 so that the secondary weir tube is oriented substantially vertically. The secondary weir tube 62 defines a secondary weir edge 66 that is located substantially centrally within the oil/water collection reservoir 50 so that the primary and secondary weir edges are arranged substantially concentric with one another. The secondary weir edge 66 defines a secondary weir plane that is located below the level of the primary weir edge 60 and the primary weir plane.

The secondary weir tube 62 defines a vortex chamber 68 which serves to enhance the development of a vortex or swirling activity that enhances movement of the oil on the surface of the water to the skimmer device and over the primary weir edge into the oil/water collection reservoir 50 and over the secondary weir edge into the vortex chamber 68. This feature ensures that a majority of the fluid entering the oil/water collection reservoir 50 and the vortex chamber 68 will be oil, with the water content of the fluid being maintained at a minimum. The vortex development and oil gathering capability of the oil skimmer devices is also materially enhanced by the volume of fluid that is drawn through each skimmer mechanism by the fluid pumping mechanisms of the skimmer devices. The macerating pumps 86 serve to break up any jelled oil/water mixture that is present, thus permitting the recovered oil to be easily pumped to the oil barge and separated by the processing system of the oil barge. The separated and cleaned water of the oil barge is then pumped overboard or is otherwise handled in a manner that protects the environment from contamination.

It is desirable that the location of the primary weir edge be as horizontal as possible and that its location relative to the surface of the water or the oil on the water be efficiently controlled. For this purpose a pair of weir depth indicators 70 and 72 are mounted to the substantially planar wall flange 54 or to the substantially vertically oriented weir wall 58 and project upwardly so that they can be visualized by workers located on the work boat 22 or oil storage barge 20. This feature enables personnel to adjust the position of the oil skimmer devices with respect to the surface of the water and adjust the depth of the primary weir edge 60 relative to the surface of the water.

For skimmer deployment and handling a lifting bail member 74 defines lifting legs 76 and 78 that are connected to the secondary weir tube or to the wall structure 48, such as by welding, bolting or by any other suitable means for mounting. The lifting bail member 74 is of sufficient structural integrity that lifting, handling and deployment equipment of the work boat 22 can strategically position each of the skimmer devices 30 within the boom opening 18.

A pump suction tube 80 extends upwardly through the wall structure 48 with its upper end portion 82 and its suction inlet opening 84 being located above the bottom of the wall structure 48, within the secondary weir tube 62 and below the secondary weir edge 66. For skimmer deployment and handling a lifting bail member 74 defines lifting legs 76 and 78 that are connected to the secondary weir tube or to the wall structure 48, such as by welding, bolting or by any other suitable means for mounting. The lifting bail member 74 is of sufficient structural integrity that lifting, handling and deployment equipment of the work boat 22 can strategically position each of the skimmer devices 30 within the boom opening 18.

A pump suction tube 80 extends upwardly through the wall structure 48 with its upper end portion 82 and its suction inlet opening 84 being located above the bottom of the wall structure 48, within the secondary weir tube 62 and below the secondary weir edge 66. At the lower end portion of the pump suction tube 80 is located a fluid pressure energized pump 86 that is driven by a hydraulically energized pump motor 87 having its suction in communication with the suction passage 88 of the pump suction tube 80. Preferably the pump 86 is a variable speed hydraulically energized "macerating pump" that is efficient for pumping some solid or jelled content as well as liquids. At times leaked oil that is present on or near the surface of a body of water becomes combined with dust, dirt, marine life and other debris and forms a jelly-like substance that tends to foul the pump intakes and weirs of conventional oil skimmer devices. To ensure the efficiency of collected oil pumping when jelled oil is encountered, it is desirable to provide a pumping system that can readily accommodate both liquid and jelled oil and this potential problem is readily solved by the macerating pump 86.

The pump 86 is preferably mounted by bolts, screws or other suitable fasteners 90 to a pump support plate 92. Though it can be of any suitable configuration the pump support plate 92 is shown as being of triangular configuration with portions thereof being connected with three depending legs 94, 96 and 98 that project in downwardly diverging relation from the body structure of the oil skimmer device. The three depending legs provide for support of the dual weir skimmer mechanism on any surface, such as the deck surface of a boat or barge and additionally provide for stability of the oil skimmer when it is deployed in the water. The upper end portions of the depending angulated legs 94, 96 and 98 are mounted, such as by welding to the pump A pump discharge conduit 100 extends from the discharge of the pump 86 and is provided with a hose connection 102 to which one of the collected oil discharge lines 40, 42 or 44 is connected. However it is to be understood that the angulated legs may be mounted to the skimmer mechanism in any suitable fashion.

The buoyancy of the dual weir skimmer mechanism 30 is controlled by a plurality of buoyancy tanks 104, 106 and 108 that are each mounted by a pair of pivotal tank support arms 110 and 112 that are mounted to pivot brackets 114 and 116 by pivot members 118 and 120. The pivotal tank support is strengthened by a support bar member 122 into which pivot bolts may be threaded. Alternatively, the support bar 122 may be of tubular geometry and may have a pivot bar extending through it and being received by pivot openings of the pivot bracket members 114 and 116.

The positions of the buoyancy tanks are selectively controlled for the purpose of adjusting the position of the outer circular weir 60 relative to the surface of the water and the oil that is present on the water. This buoyancy tank adjustment is also employed to accommodate any wave action that is present on the surface to thus control the relative percentages of oil and water that pass over the outer weir and enter into the bowl or oil/water collection reservoir 50. For tank adjustment each tank is provided with a hydraulic or pneumatic linear tank adjustment motor 124, also known as a cylinder motor. The cylinder motor 124 is connected at one end thereof to the buoyancy tank by a cylinder motor connection 126 and is connected at the opposite end thereof to a cylinder motor mount bracket 128 that is fixed to a respective one of the depending legs 94 that are connected to and extend downwardly and outwardly from the pump suction tube 80.

The cylinder motors are each provided with a hydraulic or pneumatic connection from which extends hydraulic or pneumatic buoyancy control lines 34, 36 and 38 as shown in FIG. 1. The hydraulic or pneumatic control lines also provide the motive force for operation of the pump motors of the skimmer devices. The pumped oil low lines 40, 42 and 44, shown in FIG. 1, are each connected with the pump discharge of a respective oil skimmer mechanism and are each in communication with the oil collection manifold 46 of the oil storage barge 20 for delivery of recovered oil and some water to the oil storage barge. The oil storage barge will preferably have on board a system for separating the water from the oil and for purifying and disposing of the water. Periodically, the oil storage barge can be moved to an oil receiving facility by the tugboat 24 or the workboat 22 and an empty oil storage barge can be secured in its place so that skimmed oil recovery can continue substantially uninterrupted for as long as is needed.

Operation

As shown in FIG. 1 a number of dual weir oil skimmer devices are transported to an oil recovery site, such as by means of the workboat 22 or by being transported on the deck of the oil storage barge 20, with the barge being moved by the tugboat or by both the tugboat and workboat. Upon reaching the oil recovery site an oil collection boom is deployed and maintained on station by boom handling boats 14 and 16. The boom will be positioned in U-shaped manner with an opening 18 facing the direction of any wind that might be blowing or facing any water current that might exist. The oil barge 20 will then be placed in the boom opening 18 and the oil skimmer devices 26, 28, 30, etc. will be deployed, such as by means of a hoist and crane mechanism of the workboat 22. The skimmer devices will be deployed in the water within the boom area with the hydraulic/pneumatic control lines in place and with the oil pump discharge lines 40, 42 and 44 connected with them and with the oil collection manifold 46 of the oil barge.

The hydraulic or pneumatic cylinder motors will be operated as needed to raise or lower the buoyancy tanks 104, 106 and 108 and thereby adjust the position and elevation of the outer circular weir 60 in relation to the surface of the water and the thickness of any oil accumulation on the water. This weir position adjustment will also be done to accommodate the presence of any jelled oil/water mixture that may be present on the water. The oil on the surface of the water, together with a small amount of water will pass over the outer weir 60 and enter the oil/water collection reservoir 50. With the position of the outer weir properly adjusted, the pump motor 86 is energized to accomplish suction of the collected oil and some water from the oil/water collection reservoir.

As the oil and water pass over the secondary weir 66 a vortex will be developed within a vortex chamber 68 of the secondary weir tube 62 so that the oil and water tend to form a homogeneous liquid due to the turbulence that is present within the secondary weir tube. The vortex development and oil gathering capability of the oil skimmer devices is also materially enhanced by the volume of fluid that is drawn through each skimmer mechanism by the fluid pumping mechanisms of the skimmer devices. The macerating pumps 86 serve to break up any jelled oil/water mixture that is present, thus permitting the recovered oil to be easily pumped to the oil barge. The vortex action continues as the collected fluid enters the inlet or suction of the macerating pump 86. The pump mechanism achieves further homogeneity of the oil and water and additionally breaks up any jelled oil/water mixture so that the flowing mixture being pumped to the oil barge will be consistently homogeneous.

After the pumped oil/water mixture has been received by the oil barge it will be separated to its oil and water constituents by the processing system of the oil barge. The separated and cleaned water of the oil barge will then be pumped overboard or may be otherwise handled in a manner that protects the marine environment from contamination. Alternatively, to minimize oil recovery costs, the oil and water that is collected and is pumped into the barge may be transported as is to a suitable processing station having a facility for separating the oil from the water, cleaning the water and disposing of it in any suitable manner that is protective of the environment. The dual weir arrangement of the present invention minimizes the volume of water that enters the oil/water collection chamber 50.

Figure 5:
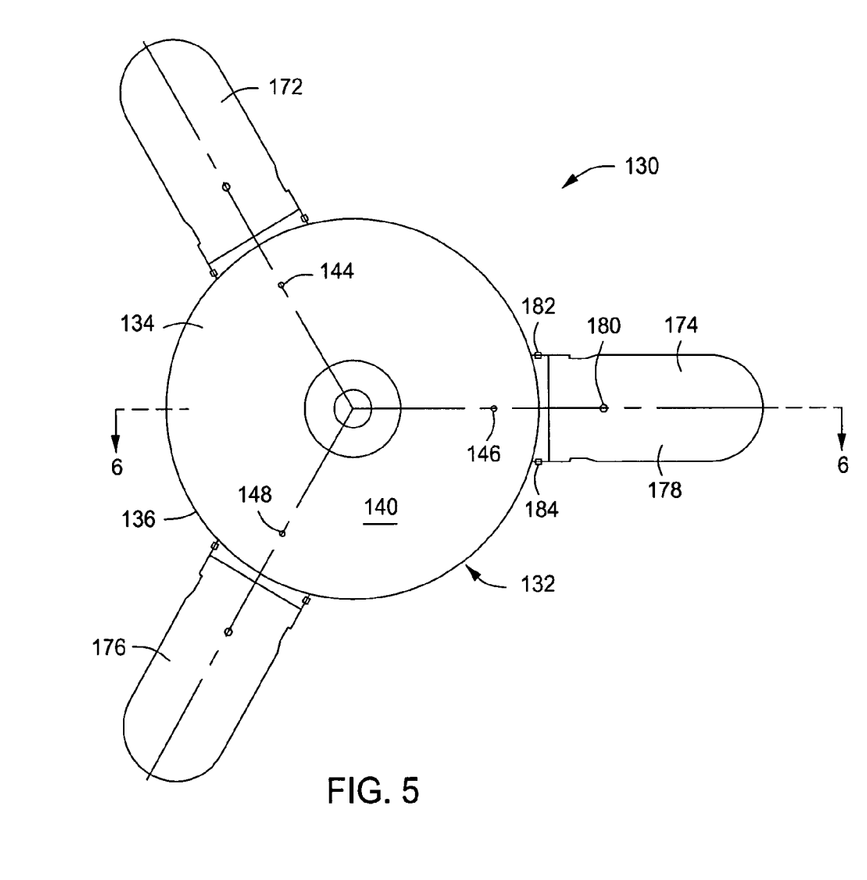
FIG. 5 is a plan view illustrating a dual weir oil skimmer mechanism that is particularly adaptable for shallow water skimming activity and represents an alternative embodiment of the present invention.
Figure 6:
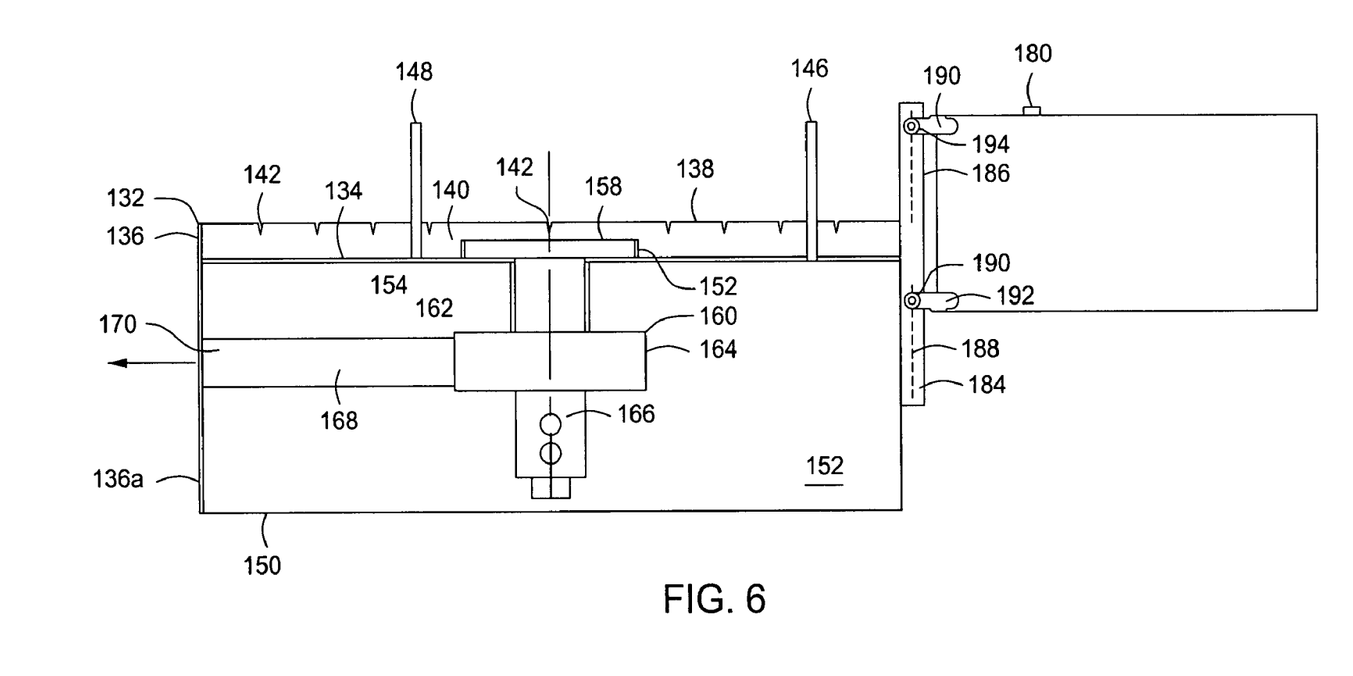
FIG. 6 is a sectional view taken along line 6-6 of FIG. 5 and showing further details of the shallow water skimmer mechanism of the alternative embodiment.

Referring now to FIGS. 5 and 6 an alternative embodiment of the oil skimmer mechanism of the present invention is shown generally at 130 which is particularly designed for skimming or capturing oil that is present on shallow water. The alternative dual weir embodiment 130 of the oil skimming device of the present invention employs an oil/water collection pan shown generally at 132 and has a substantially flat bottom wall 134 about which is located a continuous outer wall 136 that defines an outer or first weir edge 138. The bottom wall 134, continuous side wall 136 and first or outer weir edge collectively define an oil/water collection reservoir 140. The outer weir edge may be notched as shown at 142 to facilitate detection of the volume of water that is entering the reservoir 140 at any point in time.

A plurality of water depth indicators 144, 146 and 148 are mounted to the bottom wall 134 and provide operating personnel with a simple and efficient means to detect the level condition of the oil/water collection reservoir. The water depth indicators are preferably of tubular form and are mounted about vent holes in the bottom wall 134, thereby also serving as vents to accommodate changes of the depth settings of the skimmer mechanism.

The continuous wall 136 about the bottom wall 134 of the oil/water collection reservoir pan also extends downwardly as shown at 136a and defines a continuous lower edge 150 and defines a stability chamber 152 that is normally filled with water when the skimmer mechanism is deployed in oil covered water. The lower edge is substantially parallel with the bottom wall 134 of the oil/water collection pan 132. Any air that might be present in the chamber 152 when the skimmer mechanism is deployed will be vented from the chamber by the vent passages of the water depth indicator tubes.

Water in the chamber 152 is also vented by the water depth indicator and vent tubes when the position of the skimmer mechanism is changed relative to the surface of the water. The weight of the depending continuous wall 136a serves as ballast to stabilize the oil/water skimmer mechanism 130 when it is deployed in the water. The continuous lower edge 150 also serves to support the oil/water skimmer mechanism when it is resting on a surface, such as the deck of a boat, on a wharf, in a warehouse, etc.

An inner or secondary weir structure 154 is formed by an inner continuous wall 156 that is welded or otherwise fixed in sealed relation to the bottom wall 134 and defines an upper continuous secondary weir edge 158 that is disposed in a plane that is parallel with the planes of the primary weir edge 138 and the bottom wall 134. A pump suction and vortex tube 160 is connected to the bottom wall 134 about a central pump suction opening 162 of the bottom wall and is thus open to receive any oil and/or water that flows over the secondary weir edge 158 from the oil/water collection reservoir 142.

To the pump suction and vortex tube 160 is mounted a macerating pump 164 that is driven by a rotary pump motor 166 such as a hydraulically or pneumatically energized motor that is driven by a pressurized fluid output via the supply lines 34, 36 and 38 shown in FIG. 1 or by any other suitable type of rotary motor, such as an electric motor as desired by the user. A pump discharge conduit 168 extends from the pump 164 and is fixed about a pump discharge opening 170 of the depending wall portion 136a of the skimmer wall structure. A fluid transporting or oil discharge conduit such as shown at 40, 42 and 44 in FIG. 1 will be connected in any suitable manner to the pump discharge conduit 168 so that pumped fluid is conducted to the oil receiving manifold 46 one the oil barge 20.

For selectively adjusting the position of the oil skimmer mechanism in relation with the surface of the water or the surface of the oil floating on the water, three buoyancy tanks 172, 174 and 176. These buoyancy tanks are typically composed of sheet metal, but may be in the form of buoyancy body composed of materials such as polymer foam if desired. As shown at the right side portion of FIG. 1 the top wall 178 of each buoyancy tank has a threaded opening within which a threaded plug 180 is received. It is intended that the buoyancy tanks be raised and lowered relative to the oil/water collection pan 132 as needed to adjust the position and depth of the oil/water skimmer device within the water. For this purpose and for each buoyancy tank, as shown in FIGS. 5 and 6, a pair of buoyancy tank positioning brackets are shown at 182 and 184 which are each mounted to the side wall 136 and the depending side wall portion 136a.

Each of these buoyancy tank positioning brackets defines upper and lower tank adjustment geometry 186 and 188, which may be in the form of multiple spaced holes, spaced positioning recesses or the like and may be marked with position indicating indicia so that user personnel can easily move the buoyancy tanks to other selected positions relative to the level of the weir 138. Tank positioning brackets 190 and 192 are mounted in spaced relation on each of the buoyancy tanks and include tank connection pins 194 and 196 that engage with the respective upper and lower tank adjustment geometry 186 and 188 to secure each tank at a selected position.

To change the position of the buoyancy tanks relative to the level of the weir edge 138 the connection pins will be removed from the adjustment geometry, thus releasing the tank for position adjustment. User personnel will then shift the tank to a desired position and insert the connection pins as desired. Even though the skimmer mechanism is designed for manual adjustment selective manual positioning of the buoyancy tanks relative to the skimmer mechanism can be easily accomplished in a few minutes time, though requiring recovery of an oil skimmer device to the barge or work boat to accomplish manual buoyancy tank adjustment.

In view of the foregoing it is evident that the present invention is one well adapted to attain all of the objects and features hereinabove set forth, together with other objects and features which are inherent in the apparatus disclosed herein.

As will be readily apparent to those skilled in the art, the present invention may easily be produced in other specific forms without departing from its spirit or essential characteristics. The present embodiment is, therefore, to be considered as merely illustrative and not restrictive, the scope of the invention being indicated by the claims rather than the foregoing description, and all changes which come within the meaning and range of equivalence of the claims are therefore intended to be embraced therein.

We claim:

1. A skimmer system for removing a substantially liquid substance floating on the surface of a body of water, comprising:
   a reservoir body defining an collected fluid reservoir and having a primary weir edge;
   a weir tube extending upwardly from said reservoir body and defining a secondary inner weir edge being of less height than said primary weir edge, said weir tube defining a vortex chamber therein;
   a buoyancy member supporting said reservoir body in relation to the surface of the body of water and being adjustable relative to said reservoir body for selective positioning of said primary weir edge relative to the surface of the body of water;
   a pump having a suction inlet being in communication with said vortex chamber and having a discharge outlet conducting recovered oil to a collection receptacle; and
   a power source being connected in driving relation with said pump.

2. The skimmer system of claim 1, comprising:
   a pump suction tube projecting downwardly from said reservoir body and being in communication with said vortex chamber, said pump suction tube defining a lower end located below said reservoir body; and
   said pump being mounted to said lower end of said pump suction tube.

3. The skimmer system of claim 1, comprising:
   a service device providing a service platform; and
   said power source being a source of pressurized pump operating fluid located on said service platform and having fluid conducting lines connected with said pump and being controllable for operation of said pump.

4. The skimmer system of claim 1, comprising:
   said buoyancy member being movably mounted to said reservoir body; and
   a positioning motor being connected for adjustment of said buoyancy member relative to said reservoir body and being selectively operated to change the position of said buoyancy member relative to said reservoir body and thus change the position of said primary weir edge relative to the surface of the body of water.

5. The skimmer system of claim 1, comprising:
   a buoyancy member support being provided on said reservoir body;
   said buoyancy member being adjustably mounted to said buoyancy member support; and
   positioning indicators being provided on said buoyancy member support and indicating positioning adjustment of said buoyancy member relative to said reservoir body to change the position of said buoyancy member relative to said reservoir body and thus change the position of said primary weir edge relative to the surface of the body of water.

6. The skimmer system of claim 1, comprising:
   a collected fluid storage vessel having a collected fluid inlet;
   said pump being a rotary macerating pump capable for pumping liquid and semi-liquid materials;
   a work boat having a source of pressurized pump operating fluid thereon;
   pressurized fluid supply and return lines being connected with said source of pressurized pump operating fluid and connected with said macerating pump; and
   a collected fluid transfer line being connected with said discharge outlet of said macerating pump and being connected with said collected fluid inlet.

7. The skimmer system of claim 1, comprising:
   said inner weir edge being located substantially concentrically within said primary weir edge; and
   a skimmer stabilizing structure projecting downwardly below said reservoir body and stabilizing the position of said reservoir body and said primary and secondary weir edges with respect to the surface of the body of water.

8. The skimmer system of claim 7, comprising:
   said skimmer stabilizing structure incorporating a plurality of angulated legs supporting said reservoir body on a surface.

9. A skimmer system for removing a substantially liquid substance floating on the surface of a body of water, comprising:
   a boat adapted for operating on the body of water having a substance floating thereon;
   a source of pressurized fluid being located on said boat;
   a recovered fluid collection vessel having a collected fluid inlet;
   a skimmer reservoir body defining an collected fluid reservoir and defining a primary weir edge;
   a weir tube extending upwardly from said skimmer reservoir body and defining a secondary weir edge being located within said primary weir edge and being of less height than said primary weir edge, said weir tube defining a vortex chamber therein;
   a pump having a suction inlet being in communication with said vortex chamber and having a discharge outlet conducting recovered oil to said collected fluid inlet of said recovered fluid collection vessel;

a buoyancy member supporting said skimmer reservoir body on the body of water and being adjustable relative to said reservoir wall structure for selective positioning of said primary weir edge relative to the surface of the body of water; and said source of pressurized fluid being connected in driving relation with said pump.

10. The skimmer system of claim 9, comprising:

said buoyancy member being movably mounted to said skimmer reservoir body; and a positioning motor being connected for adjustment of said buoyancy member relative to said reservoir body and being selectively operated to change the position of said buoyancy member relative to said reservoir wall structure and thus change the position of said primary weir edge relative to the surface of the body of water;

a pump suction tube projecting downwardly from said reservoir body and being in communication with said vortex chamber, said pump suction tube defining a lower end located below said reservoir body;

said pump being mounted to said lower end of said pump suction tube;

a service device providing a service platform; and a source of pressurized fluid located on said service platform and having fluid conducting lines connected with said pump and with said positioning motor and being controllable for operation of said pump and for operation of said positioning motor.

11. The skimmer system of claim 9, comprising:

said buoyancy member being movably mounted to said reservoir body; and a positioning motor being connected for adjustment of said buoyancy member relative to said reservoir body and being selectively operated to change the position of said buoyancy member relative to said reservoir body and thus change the position of said primary weir edge relative to the surface of the body of water.

12. The skimmer system of claim 9, comprising:

a buoyancy member support being provided on said reservoir body;

said buoyancy member being adjustably mounted to said buoyancy member support; and positioning indicators being provided on said buoyancy member support and indicating positioning adjustment of said buoyancy member relative to said reservoir body to change the position of said buoyancy member relative to said reservoir body and thus change the position of said primary weir edge relative to the surface of the body of water.

13. The skimmer system of claim 9, comprising:

a collected fluid storage vessel having a collected fluid inlet;

said pump being a rotary macerating pump capable for pumping liquid and semi-liquid materials; and a collected fluid transfer line being connected with said discharge outlet of said macerating pump and being connected with said collected fluid inlet.

14. The skimmer system of claim 9, comprising:

said inner weir edge being located substantially concentrically within said primary weir edge; and a skimmer stabilizing structure projecting downwardly below said reservoir body and stabilizing the position of said reservoir body and said primary and secondary weir edges with respect to the surface of the body of water.

15. The skimmer system of claim 9, comprising:

said buoyancy member being a plurality of buoyancy members each being movably mounted to said skimmer body; and position adjustment members being mounted to said skimmer body and being selectively actuated to change the positions of said buoyancy members and thereby adjust the position of said primary weir edge relative to the surface of the body of water.

16. A skimmer system for removing a substantially liquid substance floating on the surface of a body of water, comprising:

a boat adapted for operating on the body of water having a substance floating on the surface thereof;

a source of pressurized fluid being located on said boat;

a recovered fluid collection vessel having a collected fluid inlet;

a skimmer reservoir body defining an collected fluid reservoir and defining a primary weir edge;

a weir tube being located within said collected fluid reservoir and defining a secondary weir edge being located within said primary weir edge and being of less height than said primary weir edge, said weir tube defining a vortex chamber therein;

a pump having a suction inlet being in communication with said vortex chamber and having a discharge outlet conducting recovered oil to said collected fluid inlet of said recovered fluid collection vessel;

a buoyancy member supporting said skimmer reservoir body on the body of water and being adjustable relative to said reservoir wall structure for selective positioning of said primary weir edge relative to the surface of the body of water; and said source of pressurized fluid being connected in driving relation with said pump.

17. The skimmer system of claim 16, comprising:

said primary weir edge being substantially continuous and defining a primary weir periphery and defining a primary weir plane; and said secondary weir edge being substantially continuous and defining a secondary weir periphery located within said primary weir periphery and defining a secondary weir plane located below and in substantially parallel relation with said primary weir plane.

18. The skimmer system of claim 16, comprising:

said buoyancy member being movably mounted to said reservoir body; and a positioning motor being connected for adjustment of said buoyancy member relative to said reservoir body and being selectively operated to change the position of said buoyancy member relative to said reservoir body and thus change the position of said primary weir edge relative to the surface of the body of water.

19. The skimmer system of claim 16, comprising:

a buoyancy member support being provided on said reservoir body;

said buoyancy member being adjustably mounted to said buoyancy member support; and positioning indicators being provided on said buoyancy member support and indicating positioning adjustment of said buoyancy member relative to said reservoir body to change the position of said buoyancy member relative to said reservoir body and thus change the position of said primary weir edge relative to the surface of the body of water.

20. The skimmer system of claim 16, comprising:
said buoyancy member being a plurality of buoyancy members each being movably mounted to said skimmer body; and
a buoyancy member adjustment mechanism being actuated for adjusting the positions of said plurality of buoyancy members relative to said skimmer body and thus adjusting the position of said primary weir edge relative to the surface of the water on which said skimmer system operates.

* * * * *